United States Patent [19]

Thompson et al.

[11] 3,856,963
[45] Dec. 24, 1974

[54] USE OF INJECTABLE COMPOSITIONS OF THE (+)-OPTIONAL ISOMER OF THE ALPHA RACEMATE OF 2-(2-ETHYL-2-PHENYL-1,3-DIOXOLAN-4-YL) PIPERIDINE TO CONTROL PAIN

[75] Inventors: Charles R. Thompson, Walnut Creek; John Hidalgo, Oakland, both of Calif.

[73] Assignee: Cutter Laboratories, Inc., Berkeley, Calif.

[22] Filed: June 14, 1973

[21] Appl. No.: 370,003

Related U.S. Application Data

[63] Continuation-in-part of Ser. No. 189,760, Oct. 15, 1971, Pat. No. 3,760,077, which is a continuation-in-part of Ser. No. 800,282, Feb. 18, 1969, Pat. No. 3,655,680.

[52] U.S. Cl. ............................................. 424/267
[51] Int. Cl. ............................................ A61k 27/00
[58] Field of Search ................................. 424/267

[56] References Cited
UNITED STATES PATENTS

| | | | |
|---|---|---|---|
| 3,262,938 | 7/1966 | Hardie et al. | 260/294.7 |
| 3,760,077 | 9/1973 | Thompson et al. | 424/267 |

*Primary Examiner*—Albert T. Meyers
*Assistant Examiner*—Allen J. Robinson
*Attorney, Agent, or Firm*—Millen, Raptes & White

[57] ABSTRACT

Injectable compositions of the (+) optical isomer of the alpha racemate of 2-(2-ethyl-2-phenyl-1,3-dioxolan-4-yl)piperidine, in free base or acid addition salt form are injected in humans sufficient to provide relief from pain but insufficient to significantly affect voluntary motor activity.

8 Claims, No Drawings

USE OF INJECTABLE COMPOSITIONS OF THE (+)-OPTIONAL ISOMER OF THE ALPHA RACEMATE OF 2-(2-ETHYL-2-PHENYL-1,3-DIOXOLAN-4-YL) PIPERIDINE TO CONTROL PAIN

This is a continuation-in-part of Application Ser. No. 189,760, filed Oct. 15, 1971, now U.S. Pat. No. 3,760,077, as a continuation-in-part of Application Ser. No. 800,282, filed Feb. 18, 1969, now U.S. Pat. No. 3,655,680.

BACKGROUND OF THE INVENTION

This invention relates to the use in humans of injectable compositions comprising an optical isomer of 2-(2-ethyl-2-phenyl-1,3-dioxolan-4-yl)piperidine to relieve pain.

U.S. Pat. No. 3,262,938, issued July 26, 1966, discloses a class of 2-substituted-4-(2-piperidyl)-dioxolanes, including in Example 12 the alpha racemate of 2-ethyl-2-phenyl-4-(2-piperidyl)-1,3-dioxolane, the isomer employed in the method of this invention being the (+)-optical isomer thereof. It is disclosed to possess spasmolytic, anti-convulsant and central nervous system depressing activity. It is prepared by reacting the alpha racemate of 2-piperidyl-1,2-ethanediol hydrochloride with 1-phenyl-1,1-dipropoxypropane. Optical isomers of other dioxolanes are prepared, as disclosed in Examples 7–10 of that patent, by forming an acid addition salt of the corresponding racemate with an optically active acid and separating the optical isomers of the acid addition salt by fractional crystallization.

In Application Ser. No. 189,760, there is claimed novel compositions adapted for parenteral administration comprising a pharmaceutically acceptable acid addition salt of the (+) optical isomer of the alpha racemate of 2-(2-ethyl-2-phenyl-1,3-dioxolan-4-yl)piperidine, substantially, free from its isomers. In one aspect of the method of using those novel compositions claimed therein such a composition is injected parenterally, preferably intramuscularly, into a mammal, preferably a feline or primate, in an amount effective to at least calm (at lower dosages) or immobilize (at higher dosages) the mammal but less than that which induces general anesthesia. In a preferred aspect of that method, the composition is injected parenterally, preferably intravenously, in a mammal, preferably a primate, in an amount effective to induce general anesthesia.

SUMMARY OF THE INVENTION

The method of this invention of relieving pain in humans comprises administering, intravenously or intramuscularly, in a sterile injectable admixture with a pharmaceutically acceptable carrier, to a human patient in pain, an amount corresponding to about 0.05 to 0.5 mg/kg., when the administration is intravenous and about 0.1 – 1 mg/kg., when the administration is intramuscular, of the (+) optical isomer of the alpha racemate of 2-(2-ethyl-2-phenyl-1,3-dioxolan-4-yl)-piperidine or a pharmaceutically acceptable acid addition salt thereof, substantially free from its isomers, effective to provide relief from the pain but insufficient to significantly affect voluntary motor activity.

DETAILED DISCUSSION

The (+) optical isomer of the alpha racemate of 2-(2-ethyl-2-phenyl-1,3-dioxolan-4-yl)piperidine unexpectedly possesses useful and unexpected analgesic activity at a dosage below that which significantly affects voluntary motor activity. The analgesia induced in the method of this invention is unusual in that complete analgesia can be induced, as demonstrated by indifference to noxious and painful stimuli, without inducing a comatose state.

The active compound of the compositions employed in the method of this invention is slightly water-soluble and is most stable at pH 6 or higher. It is less stable below pH 6. A preferred embodiment of the compositions employed in the method of this invention is in a sterile aqueous solution of a pharmacologically acceptable acid addition salt, preferably a buffered solution, e.g., containing from 0.1 to 5%, of the compound of this invention. A suitable buffer is sodium succinate. Anti-microbial agents may be added to the solution of the compound of this invention, e.g., when packaged in multiple dose containers, e.g., benzethonium chloride or benzalkonium chloride, at a concentration of about 0.01%.

Other routes of administration besides intravenous are useful. Intramuscular administration is usually preferred. In a preferred embodiment of this invention, the active compound is in the form of a pharmaceutically acceptable acid addition salt in a composition adapted for intramuscular injection. These compositions can be either aqueous or oily suspensions or aqueous solutions. The active compound is preferably present therein at a concentration of between 0.5 and 5.0%.

The active compound of the compositions employed in the method of this invention, viz., alpha(+)-2-ethyl-2-phenyl-1,3-dioxolan-4-yl)piperidine, can be employed in free base form or preferably as a pharmaceutically acceptable acid addition salt. The latter can be prepared in the conventional manner by reacting the free base form with an inorganic or organic acid. Because of their greater solubility in conventional pharmaceutically acceptable carriers, the salt forms are employed for the administration of the compounds for the pharmacological purposes set forth herein. In other respects, the acid addition salt form of the compound of this invention is the equivalent of the free base form. Examples of pharmaceutically acceptable salts are water soluble salts of inorganic acids, e.g., hydrochloric, hydrobromic, hydiodic, nitric, sulfuric and phosphoric acid, and salts of organic acids, including aliphatic, alicyclic, araliphatic, aromatic and heterocyclic, mono- or polybasic carboxylic acids, e.g., formic acid, acetic acid, propionic acid, diethylacetic acid, malonic acid, succinic acid, pimelic acid, fumaric acid, maleic acid, lactic acid, tartaric acid, malic acid, amino-carboxylic acids, citric acid, gluconic acid, ascorbic acid and sulfonic acids, e.g., methanesulfonic, ethanesulfonic and p-toluenesulfonic acids.

The active compound of the compositions employed in the method of this invention is formulated with conventional pharmaceutical excipients adapted for parenteral administration. Aqueous solutions are preferred for intravenous administration. Oily and aqueous solutions and emulsions, as well as aqueous solutions can be employed for intramuscular administration.

The compositions of this invention are usually administered intramuscularly, e.g., as a dilute solution, e.g., 0.5 – 2.0% of the active compound in sterile water, preferably also containing about 0.01% of benzethonium chloride and about 0.05 – 0.07 M sodium succinate or phosphate buffer sufficient to maintain a pH of about 6.5 – 7.3.

The exact effective dosage depends upon the level of pain in the particular patient and the route of administration. About 0.05 – 0.5 mg/kg., preferably about 0.15–0.35 mg/kg., is usually administered intravenously and about 0.1 – 1.0 mg/kg., preferably about 0.3–0.7 mg/kg., is usually administered intramuscularly. Thus, the total single dose for a 70 kg. man is usually about 3.5 – 35 mg. intravenously, e.g., about 20 mg., and about double that amount intramuscularly. This dose can be repeated every 4 to 6 hours or at longer or shorter intervals as needed. It will be apparent that in cases of intractable pain an amount corresponding pharmacologically to the above single dosages can be continuously infused intravenously or administered intramuscularly by injection in a slow-release vehicle.

The maximum single dose which is administered in the method of this invention is that at which a measurable but still insignificant effect on motor activity is observed. This distinguishes the claimed process from that of Ser. No. 189,760, where a dose is administered which significantly affects voluntary motor activity. Surprisingly, although the effective compound is a highly effective immobilizing and anesthetic agent at higher dosages, analgesia can be effected at lower dosages without inducing these other effects. The object of the instant process is to provide at least partial relief from pain in human patients without significantly affecting voluntary motor activity. Thus, it is administered at dosages which do not significantly affect the ability of the patient to feed himself, walk and otherwise attend to his personal needs. It is not desired to immobilize or render the patient only partially conscious or unconscious. Therefore, an effective dose is selected which is below that at which these effects occur. This can readily be determined by the injection of low dosages and increasing them until analgesia is achieved.

The minimum single dose which is administered in the method of this invention is that at which significant relief is observed by the patient in pain. This dose can be determined experimentally by electrical ear algesimetry, following the procedure of Shulman, M. and Sadove, M.S., Anesth. and Analg. 49:905–912, 1970; Sadove et al., ibid, 50:452–457 (1971). See also Charles A. Winter, "The Physiology and Pharmacology of Pain and Its Relief," "Analgetics," George de Stevens, Academic Press (1965), Chapter II, pp. 10–74. Clinically, the optimum dosage is determined subjectively by the patient's degree of relief from the pain being experienced by him. As will be apparent to those skilled in the art, where it is usually desirable to eliminate pain completely when practicing the method of this invention, this invention is also useful in only reducing the level of pain in the patient, including actually reducing the level of pain and/or reducing the patient's apprehension and reactive threshold to the pain.

A preferred class of patient for the method of this invention are patients experiencing pain of such a high level that codeine orally and the non-narcotic mild analgesics having antipyretic activity, e.g., the salicylates, phenyl-pyrazoles, para-aminophenols and their derivatives, provide inadequate or no relief. Of these patients, preferred are those whose pain is of a surgical, traumatic or pathological origin rather than psychic in nature.

Because 2-(2-ethyl-2-phenyl-1,3-dioxolan-4-yl)piperidine has three asymmetric carbon atoms, it can exist as four different racemic mixtures. Three of these are specifically disclosed in U.S. Pat. No. 3,262,938. The two racemates produced from the alpha racemate of 2-piperidyl-1,2-ethanediol (the hydrochloride of which melts at 100°–101°) are designated "alpha racemate" (Example 12) and "gamma racemate" (Example 13). Of the two racemates which were produced from the beta racemate of 2-piperidyl-1,2-ethanediol (whose hydrochloride melts at 139°–141°), the one which was isolated was designated the "beta racemate." The compound employed in the method of this invention is the dextrorotatory optical isomer of the alpha racemate of 2-(2-ethyl-2-phenyl-1,3-dioxolan-4-yl)-piperidine. Nuclear magnetic rotation spectra have established the piperidine ring and the phenyl ring are trans with respect to the dioxolane ring.

The active compound employed in the method of this invention can be prepared from the alpha racemate of Example 12 of U.S. Pat. No. 3,262,938 in the conventional manner, e.g., by forming an acid addition salt of the free base thereof with an optically active acid and fractionally crystallizing the resulting mixture to separate the optical isomers. Preferably, however, it is prepared according to the process set forth in the preparations hereinafter.

It was established that the optical isomer employed in the method of this invention is the (+) optical isomer of the alpha racemate of Example 12 of U.S. Pat. No. 3,262,938, rather than the (+) optical isomer of the gamma racemate of Example 13, by following the procedure described in Preparation 1 herein using the (−) optical isomer of the alpha racemate of 2-(2,2-diphenyl-1,3-dioxolan-4-yl)piperidine of Example 10 of U.S. Pat. No. 3,262,938, to produce the (+) optical isomer of the alpha racemate of 2-piperidyl-1,2-ethanediol of Preparation 14 of U.S. Pat. No. 3,262,938. This compound was then reacted with propiophenone dipropyl acetal and a levorotatory optical isomer of 2-(2-ethyl-2-phenyl-1,3-dioxolan-4-yl)piperidine was isolated. A 50:50 physical mixture of this optical isomer and the (+) optical isomer of this invention when recrystallized produced the alpha racemate of Example 12 of U.S. Pat. No. 3,262,938.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

Preparation 1 — Alpha (+)2-(2-ethyl-2-phenyl-1,3-dioxolan-4-yl)-piperidine hydrochloride A solution of 477 g. of the (+) optical isomer of the alpha racemate of 2-(2,2-diphenyl-1,3-dioxolan-4-yl)piperidine hydrochloride (U.S. Pat. No. 3,262,938, Example 9) in 1,500 ml. methanol, 25 ml. water and 20 ml. concentrated hydrochloric acid was refluxed 2 hours. Most of the methanol was removed by distillation and the concentrate was diluted with 1,500 ml.

ether. The crystalline product which precipitated was filtered, washed with ether and recrystallized from isopropanol and dried to give 240.9 g. of alpha(−)2-piperidyl-1,2-ethanediol hydrochloride, melting at about 137–139; $\alpha_D^{25} = -8.12$.

Analysis:
Calcd. for $C_7H_{15}NO_2 \cdot HCl$: C, 46.28; H, 8.88; N, 7.71; Cl, 19.52
Found: C, 46.02; H, 8.84; N, 7.87; Cl, 19.46

A mixture of 1017 g. of alpha(−)2-piperidyl-1,2-ethanediol hydrochloride and 1,592 g. of propiophenone dipropyl acetal (U.S. Pat. No. 3,262,938) in 6 liters of anhydrous isopropanol was brought to reflux and a solution of anhydrous hydrogen chloride in propanol was added to bring the pH between 1 and 2. The solution was refluxed about 2 hours, allowed to remain at room temperature overnight and the crystalline product which formed was recrystallized twice from isopropanol and dried to give alpha(+)-2-(2-ethyl-2-phenyl-1,3-dioxolan-4-yl)piperidine hydrochloride, melting at about 221.5° – 222.0°; $\alpha_D^{25} = +16.63$.

Analysis:
Calcd. for $C_{16}H^{23}NO_2 \cdot HCl$: C, 64.52; H, 8.12; N, 4.70; Cl, 11.90
Found: C, 64.37; H, 7.93; N, 4.79; Cl, 11.83

The solvent was removed from the mother liquors and the residue was heated for several hours in refluxing propanol containing anhydrous hydrogen chloride and additional propiophenone dipropyl acetal. Isolation of crystalline product in the manner described above yielded an additional amount of the alpha(+)-isomer.

Preparation 2 — Alpha(+)2-(2-ethyl-2-phenyl-1,3-dioxolan-4-yl)-piperidine maleate An aqueous solution of the hydrochloride salt of Preparation 1 was rendered basic with dilute sodium hydroxide solution and the free base was extracted with ether. The ether solution was dried over magnesium sulfate, filtered, and the ether was removed. A molar equivalent of maleic acid in ethanol was added to the free base and the solution was diluted with dry ether. The crystalline product was recrystallized from isopropanol to give alpha(+)2-(2-ethyl-2-phenyl-1,3-dioxolan-4-yl)-piperidine maleate, melting at about 127.5° – 128.5°.

Analysis:
Calcd. for $C_{16}H_{23}NO_2 \cdot C_4H_4O_4$: C, 63.65; H, 7.21; N, 3.71
Found: C, 63.66; H, 7.10; N, 3.57

Preparation 3 — Sterile Aqueous Solution

For intravenous administration, form a 0.5 – 2% sterile aqueous solution of alpha(+)2-(2-ethyl-2-phenyl-1,3-dioxolan-4-yl)piperidine hydrochloride. For administration to humans, infuse in a lactated Ringer's solution.

Preparation 4 — Sterile Aqueous Solution

For intramuscular administration, prepare a 2–5% sterile aqueous solution of alpha(+)2-(2-ethyl-2-phenyl-1,3-dioxolan-4-yl)piperidine hydrochloride.

To obtain a longer-acting composition dissolve the (+) optical isomer of the alpha racemate of 2-(2-ethyl-2-phenyl-1,3-dioxolan-4-yl)piperidine in a suitable oil, e.g., corn, peanut, cottonseed or sesame oil.

EXAMPLE 1

To a male patient in post-operative pain from a hernia operation, inject intramuscularly as a 2.5% sterile aqueous solution, about 0.5 mg/kg. of the (+)-optical isomer of the alpha racemate of 2-(2-ethyl-2-phenyl-1,3-dioxolan-4-yl)piperidine hydrochloride. Repeat every 4–6 hours or as needed.

EXAMPLE 2

To an adult patient in pain from second and third degree burns and receiving fluids intravenously, administer, by injecting into the stream of infusing liquid, a 1% sterile aqueous solution of the (+) optical isomer of the alpha racemate of 2-(2-ethyl-2-phenyl-1,3-dioxolan-4-yl)piperidine hydrochloride. Repeat every 4–6 hours as needed (about 0.3 mg/kg.).

Follow the same procedure of both Examples 1 and 2 with patients suffering from soft tissue trauma, e.g., accident patients suffering extensive overall injuries.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method of relieving pain in humans which comprises administering intravenously or intramuscularly to a human patient in pain, a sterile injectable composition comprising, in admixture with a pharmaceutically acceptable carrier, an amount corresponding to about 0.05 to 0.5 mg/kg., when the administration is intravenous and about 0.1 – 1 mg/kg., when the administration is intramuscular, of the (+) optical isomer of the alpha racemate of 2-(2-ethyl-2-phenyl-1,3-dioxolan-4-yl)-piperidine or a pharmaceutically acceptable acid addition salt thereof, substantially free from its isomers, effective to provide relief from the pain but insufficient to significantly effect voluntary motor activity.

2. The method according to claim 1 wherein the composition is administered intramuscularly.

3. The method according to claim 2 wherein the composition is administered as the hydrochloride acid addition salt.

4. The method according to claim 3 wherein about 0.3 – 0.7 mg/kg. of the effective compound is administered intramuscularly.

5. The method according to claim 1 wherein the administration is intravenously.

6. The method according to claim 5 wherein the composition is administered as the hydrochloride acid addition salt.

7. The method according to claim 6 wherein about 0.15–0.35 mg/kg. of the effective compound is administered intraveneously.

8. The method according to claim 1 wherein the pain is of surgical, trauma or pathological origin.

* * * * *